US011260397B2

(12) United States Patent
Brothier et al.

(10) Patent No.: US 11,260,397 B2
(45) Date of Patent: Mar. 1, 2022

(54) DEVICE FOR GRANULATING POWDERS BY CRYOGENIC ATOMISATION

(71) Applicant: COMMISSARIAT A L'ENERGIE ATOMIQUE ET AUX ENERGIES ALTERNATIVES, Paris (FR)

(72) Inventors: Méryl Brothier, Aix-en-Provence (FR); Stéphane Vaudez, Avignon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 537 days.

(21) Appl. No.: 15/770,915

(22) PCT Filed: Nov. 3, 2016

(86) PCT No.: PCT/EP2016/076513
§ 371 (c)(1),
(2) Date: Apr. 25, 2018

(87) PCT Pub. No.: WO2017/076950
PCT Pub. Date: May 11, 2017

(65) Prior Publication Data

US 2018/0304217 A1 Oct. 25, 2018

(30) Foreign Application Priority Data

Nov. 4, 2015 (FR) ...................................... 1560568

(51) Int. Cl.
*B02C 19/18* (2006.01)
*B01J 2/10* (2006.01)
(Continued)

(52) U.S. Cl.
CPC ............... *B02C 19/186* (2013.01); *B01J 2/04* (2013.01); *B01J 2/10* (2013.01); *B01J 2/16* (2013.01);
(Continued)

(58) Field of Classification Search
CPC ......... B02C 19/186; B02C 23/38; B01J 2/04; B01J 2/10; B01J 2/16; B01J 2/18; B01J 2/30
(Continued)

(56) References Cited

U.S. PATENT DOCUMENTS 2,609,150 A * 9/1952 Bludeau .................. B29B 13/10 241/15
3,321,560 A * 5/1967 Wilkinson ................. B01J 2/04 264/0.5
(Continued)

FOREIGN PATENT DOCUMENTS

BE 690085 A 5/1967
EP 0945173 A1 9/1999
(Continued)

OTHER PUBLICATIONS

Cryogenic Fluids Uses Google.com (Year: 2021).*

(Continued)

*Primary Examiner* — Matthew Katcoff
*Assistant Examiner* — Smith Oberto Bapthelus
(74) *Attorney, Agent, or Firm* — Pearne & Gordon LLP

(57) ABSTRACT

A device for granulating powders by cryogenic atomisation, characterised in that it comprises: a device for mixing powders by cryogenic fluid, comprising at least one chamber for mixing powders, comprising a cryogenic fluid; and a device for atomising a suspension of powders mixed by the device for mixing powders in order to allow a granulation of the powders, comprising a way of fractionating the suspension of powders making it possible to adjust the size of the droplets of powders to be atomised, and a method for adjusting the moisture of the mixed powders and/or the moisture of the atomisation atmosphere.

22 Claims, 6 Drawing Sheets

(51) Int. Cl.
  *B01J 2/18*  (2006.01)
  *B01J 2/16*  (2006.01)
  *B02C 23/38* (2006.01)
  *B01J 2/04*  (2006.01)
  *B01J 2/30*  (2006.01)
  *B22F 9/08*  (2006.01)
  *G21C 3/04*  (2006.01)

(52) U.S. Cl.
  CPC ............. *B01J 2/18* (2013.01); *B01J 2/30* (2013.01); *B02C 23/38* (2013.01); *B22F 9/082* (2013.01); *B22F 2009/088* (2013.01); *B22F 2009/0824* (2013.01); *G21C 3/045* (2019.01)

(58) Field of Classification Search
  USPC .......................................................... 241/30
  See application file for complete search history.

(56) References Cited

U.S. PATENT DOCUMENTS

| | | | |
|---|---|---|---|
| 3,363,846 A * | 1/1968 | Eck | B02C 19/186 241/15 |
| 3,373,119 A | 3/1968 | Krystyniak | |
| 4,222,527 A * | 9/1980 | Davis | A23G 1/047 241/33 |
| 4,721,256 A * | 1/1988 | Lyman | B02C 19/186 241/1 |
| 6,656,391 B1 | 12/2003 | Bonnerot et al. | |
| 2005/0006496 A1 | 1/2005 | Partington et al. | |
| 2008/0192568 A1 | 8/2008 | Hielscher et al. | |
| 2014/0000297 A1 * | 1/2014 | Wieland | A23D 9/05 62/64 |
| 2017/0345521 A1 | 11/2017 | Vaudez | |
| 2017/0358376 A1 | 12/2017 | Benedetti et al. | |

FOREIGN PATENT DOCUMENTS

| | | |
|---|---|---|
| EP | 1137597 A1 | 10/2001 |
| JP | S59-196701 A | 11/1984 |
| JP | H10-015370 A | 1/1998 |
| JP | 2002-530261 A | 9/2002 |
| JP | 2004-506081 A | 2/2004 |
| JP | 2006-239665 A | 9/2006 |
| JP | 2008-500160 A | 1/2008 |

OTHER PUBLICATIONS

Valves definition Google.com (Year: 2021).*
English translation of the Office action for JP 2018-522551 dated Jul. 28, 2020.
International Search Report for International Application No. PCT/EP2016/076513, dated Feb. 1, 2017.
Written Opinion for International Application No. PCT/EP2016/076513, dated Feb. 1, 2017.
Preliminary French Search Report for Application No. FR1560568, dated Jun. 29, 2016.

* cited by examiner

DEVICE FOR GRANULATING POWDERS BY CRYOGENIC ATOMISATION

This is a National Stage application of PCT international application PCT/EP2016/076513, filed on Nov. 3, 2016 which claims the priority of French Patent Application No. 1560568, filed Nov. 4, 2015, both of which are incorporated herein by reference in their entirety.

TECHNICAL FIELD

This invention relates to the field of preparing granular mediums, and more precisely the granulation of powders, in particular of actinide powders, in order to obtain granules by cryogenic atomisation.

In a privileged manner, it applies to the atomisation of powders that must not be placed in contact with a liquid, in particular with water, in particular for reasons of contamination of these powders by the liquid, for reasons of instability of the powders, and even for reasons of a risk of criticality in the case of the use of radioactive powders.

The invention preferably has application for the granulation of actinide powders allowing for the formation of nuclear fuel, in particular pellets of nuclear fuel.

The invention as such proposes a device granulating powders by cryogenic atomisation, as well as an associated method for granulating powders.

Prior Art

Implementing different steps for preparing a granular medium, in particular from actinide powders in order to form pellets of nuclear fuel after forming by pressing, is essential as it substantially conditions the control of the microstructure of the final produce but also the presence or not of macroscopic aspect defects within a fuel pellet. In particular, the mixture of actinide powders in order to allow for the production of nuclear fuel constitutes a key step in the controlling of the quality of the fuel pellet obtained, which most often is subjected to compliance with strict requirements in terms of microstructure and impurities.

The industrial, conventional and historical method of powder metallurgy applied to the elaboration of nuclear fuel is based on steps of mixing, grinding and/or granulation, all carried out dry. Indeed, implementing liquid in the nuclear industry induces the generation of effluents that can be difficult to treat. Also, for the preparing of a granular medium for the purpose of elaborating nuclear fuel, procedures other than those that use the dry method are not conventionally used.

In order to carry out the mixing of powders, various devices are known in prior art, which can be broken down according to the families described hereinafter. First of all, there is the principle of the dry phase mixer without internal media. This can in particular be a mixer of the Turbula® type from the company WAB which through movements that are more or less complex of the tank containing the powders to be mixed, allows for a more or less substantial homogenisation of the granular medium. Generally, the effectiveness of this type of mixture is limited. Indeed, according to the type of powders to be mixed, heterogeneous zones can subsist, for which the mixture does not take place or in the least incorrectly and inadmissibly. The kinematics of this type of mixture is generally not complex enough to induce a pushed mixture, i.e. a mixture that is satisfying in terms of homogeneity, without a pushed development itself or a mixing duration that is penalising at the industrial level.

Moreover, the energy transmitted to the granular medium in this type of mixer does not make it possible to carry out deagglomeration that is sufficient to reach sufficient degrees of homogeneity in the case where the size of these agglomerates is excessive (in particular to be offset during the step of sintering).

The principle of the media mixture is also known. According to this principle and in order to favour the operation of mixing, one or several mobile facilities can be used within the tank containing the powder to be mixed. These mobile facilities can be blades, turbines, coulters, ribbons, endless screws, among others. In order to improve the mixing, the tank can itself be mobile. This type of mixer can be more effective than the preceding category but still remains insufficient and suffers from limitations. Indeed, the mixing induces a modification in the granular medium via agglomeration or a deagglomeration that is difficult to control, which induces an overrunning of powders and/or a degradation in the flowability of the granular medium. Moreover, the use of mobile facilities (media) for mixing results in pollutions (contaminations) when it concerns mixing abrasive powders such as those that have to be implemented to produce nuclear fuel. In addition, the mobile facilities implemented induce retentions which generate flow rates of doses that have a substantial impact in the case of elaborating nuclear fuel.

There is also the principle of the mixer of the grinder type. Indeed, according to the usage mode and the type of technology of certain grinders, it is possible to produce mixtures of powders via co-grinding. This type of operation makes it possible to obtain a satisfactory mixture, from a homogeneity standpoint, but requires a relatively long grinding time, typically several hours, and also induces grinding phenomena that reduce the size of the particles of powders. This causes the generation of fine particles and a modification in the specific surface which also affects the possibility of using the powders later after the mixing thereof (modification in flowability, reactivity (possible oxidation), sinterability of the powders, etc.). In the framework of manufacturing nuclear fuel, the operation of co-grinding, by generating fine particles causes a non-negligible radiological impact, due to the retention and the propensity of the fine particles to disperse. Moreover, clogging phenomena can be induced.

After using these various types of mixers, it is often necessary to carry out an agglomeration or granulation. In addition, these devices are generally discontinuous, which can be an issue in industrial methods.

Other mixtures are also known, implementing a multiphase medium, namely fluid-solid phases. The mixers of the liquid/solid type, for example, are not operable for the implementing of powders soluble with the liquid phase used in the mixer or if the powders are modified by the contact with the fluid. Moreover, for powders that have a high density compared to the liquid introduced into the mixer, the mixture is most often not effective or requires substantial agitation speeds. Indeed, the pulling-off speed of a particle from the bottom of the agitator is directly linked to the difference in density between the particles constituting the powders and that of the liquid allowing for the placing in suspension.

Generally, the aforementioned mixers are not fully satisfactory for mixing certain powders, such as actinide powders, and for allowing for an industrial implementation, for example, the easy filling of press moulds, for forming operations. Note that the mixers of powders in liquid phase, in particular of the type of those described in patent applications CA 2 882 302 A1, WO 2006/0111266 A1 and WO 1999/010092 A1, are not suited for the problem of a mixture of powders of the actinide powder type, because they would require excessively high agitation speeds to hope to pull off the powders from the bottom of the agitation tank and achieve levels of homogeneity that are in accordance with those sought in the nuclear industry. In addition, once again, they would induce contaminated effluents, difficult to manage industrially but also risks of criticality, even of radiolysis of the liquid phase used due to the fact of the nature of the powders to be implemented (beyond the fact that the latter can interact chemically with the liquid used).

It is therefore generally necessary to follow this with a step of granulation in order to obtain a flowable granular medium.

The granulation can be done, conventionally, according to the methods described hereinafter.

First of all, by mechanical granulation, the mixed powders are compacted, then granulated by grinding/crushing. This step generates fine particles, which is penalising from the point of view of the risk of contamination when the powders are radioactive powders, such as actinide powders.

The granulation can further be carried out via screening or forcing. Then, the powders are forced to pass through a screen of which the meshes are chosen so as to control the size of the agglomerates.

The granulation can finally be carried out via atomisation. In this case, the powders are placed in suspension in a liquid phase of the additive aqueous solution type, for example. These additives, generally organic compounds, as mentioned in patent application EP 1 137 597 A1, can make it possible to control the viscosity and the surface tension of the suspensions in order to allow for a controlling of the atomisation. The use of organic compounds is however able to generate a pollution of the powders to be atomised. Moreover, using liquid for the atomisation requires a step of drying of which the adjustment is not trivial and requires at least the presence of heating elements in order to proceed with the drying, such as imposed for example in patent application EP 1 137 597 A1.

Furthermore, when it is a question of proceeding with the operations of mixing powders, then with granulation, several difficulties appear. As such, they can be a risk of deterioration of the mixture obtained during the transfer of the powders from one step to the other, namely from the step of mixing to the step of granulation. In addition, there can be a difficulty as to the transfer of the powders after mixing, with the mixing very often inducing an overrunning of the powders which negatively affects their flowability. Finally, this can generate fine particles, which is penalising for the implementation of radioactive powders, such as actinide powders.

DISCLOSURE OF THE INVENTION

There is as such a need to propose a new type of device for granulating powders for the preparing of granular mediums, and in particular for the granulating of actinide powders.

In particular, there is a need to be able at the same time to:
    deagglomerate the powders to be mixed without necessarily modifying the specific surface thereof and generate fine particles,
    mix the powders with a level of homogeneity that is sufficient to obtain a mixture of powders that meets the specifications, in particular in terms of homogeneity (i.e. making it possible in particular to obtain a representative elementary volume (REV) within the granular medium of about a few cubic micrometres to about 10 $\mu m^3$),
    not induce any pollution of the powders to be mixed, or modification in the surface chemistry, or generate liquid effluents that are difficult to treat,
    not induce any risk of specific criticality,
    not induce any risk of specific radiolysis,
    not induce any heating of the powders to be mixed,
    rely on a mixer with a limited diameter for controlling the risk of criticality even in the case of a loading error of the mixer,
    carry out the operation of mixing by limiting as much as possible the energy expended and this in a relatively short time with respect to the other mixers, i.e. about a few minutes compared to a few hours (for other mixing systems such as ball mills), for the same quantity of material to be mixed,
    have a continuous or practically continuous method of mixing.

The invention has for purpose to overcome at least partially the needs mentioned hereinabove and the disadvantages pertaining to embodiments of prior art.

The invention has for object, according to one of its aspects, a device for granulating powders, in particular of actinide powders, by cryogenic atomisation, characterised in that it comprises:
    a device for mixing powders by a cryogenic fluid, comprising at least one chamber for mixing the powders, comprising a cryogenic fluid,
    a device for atomising a suspension of powders mixed by the device for mixing powders in order to allow for a granulation of the powders, comprising:
        means for fractionating the suspension of powders allowing for the adjustment of the dimension of the droplets of the suspension of powders to be atomised,
        means for adjusting the moisture of the mixed powders and/or the moisture of the atomisation atmosphere.

Note that, usually, a cryogenic fluid designates a liquefied gas retained in liquid state at low temperature.

Thanks to the invention, it is possible to combine an operation of mixing powders in the liquefied gas phase with an atomisation of the suspension of powders mixed. The mixture using a cryogenic fluid (liquefied gas), the separation of the liquid constituting the suspension of powders itself can as such not be based on a drying but on bringing the suspension back to ambient temperature, which greatly facilitates the operation of separating the liquid constituting the suspension from the powders granulated as such.

The device for granulating powders according to the invention can furthermore comprise one or several of the following characteristics taken individually or according to any technically possible combinations.

The cryogenic fluid can comprise a slightly hydrogenated liquid, which is a liquid comprising at most one hydrogen atom per molecule of liquid, having a boiling temperature less than that of water.

The means for fractionating the suspension of powders can be configured to allow for the adjustment of the diameter of the droplets of suspension of powders to be atomised, in such a way that the diameter of the droplets of the suspension of powders is defined according to the following relationship:

$$\frac{d_o}{D} = G\left\{\frac{fD}{v}, \frac{1}{We}, \frac{1}{Re}, \frac{A}{D}\right\}$$

with We=ρv²·(d_o)/σ and Re=ρd_ov/μ,
where:
f represents the vibration frequency of the device for atomising,
v represents the speed of the suspension of powders,
ρ represents the density of the suspension of powders to be fractionated,
μ represents the viscosity of the suspension of powders to be fractionated,
σ represents the surface tension of the suspension of powders to be fractionated,
A represents the oscillation amplitude of an atomisation nozzle of the device for atomising,
$d_o$ represents the diameter of the droplets, and
D represents the diameter of an atomisation nozzle of the device for atomising.

Advantageously, the means for fractionating the suspension of powders can be implemented through at least one atomisation nozzle of the device for atomising, in particular a vibrating nozzle, for example with a vibration frequency between 100 Hz and 10,000 Hz, or piezoelectric, for which in particular it can be possible to adjust the frequency f and also the amplitude A in order to be able to easily adjust the granulometry of the droplets of suspension of powders according to the relationship given hereinabove.

Moreover, the means for fractionating the suspension of powders can be configured to allow for the adjusting of the diameter of the droplets of suspension of powders to be atomised by modulation according to a reduction factor R of the diameter between the diameter of the droplets of suspension of powders to be atomised and the diameter of the granules, or agglomerates, obtained after atomisation of the suspension of mixed powders and evaporation of the cryogenic fluid, in such a way that:

$$\frac{d_0}{d_s} = R = \sqrt[3]{\frac{[U]_f}{[U]_i}}$$

where:
$d_o$ represents the diameter of the droplets,
$d_s$ represents the diameter of the granules,
$[U]_f$ represents the volume occupancy rate of powders in the agglomerate of granules formed after granulation, and
$[U]_i$ represents the concentration in powders of the suspension of powders to be atomised.

The means for adjusting the humidity of the mixed powders and/or the moisture of the atomisation atmosphere can comprise means of steaming powders. These means of steaming powders can allow for the adjusting of the moisture, in particular before atomisation, by a more less pushed steaming of the powders.

The means for adjusting the humidity of the mixed powders and/or the moisture of the atomisation atmosphere can further comprise a generator of humidity and a dehumidifier. The adjustment of the humidity can as such be carried out through this generator of humidity associated with the dehumidifier, allowing for the obtaining of a wide range of water contents, in order to provide an atomisation atmosphere that is more or less humid.

Furthermore, the device for mixing can further comprise:
a chamber for supplying powders in order to allow the powders to be introduced into the mixing chamber,
means for agitation in the mixing chamber so as to allow the mixing of the powders placed in suspension in the cryogenic fluid.

According to an embodiment, the device for mixing can comprise means for mixing of the mixing chamber according to a gyroscopic movement.

In particular, the means for mixing according to a gyroscopic movement can allow for the rotation of the mixing chamber according to the three axes of three-dimensional metrology. This type of agitation via gyroscopic movement can in particular make it possible to favour the mixing of powders when they have high densities compared to the density of the fluid phase of the cryogenic fluid located in the mixing chamber.

According to another embodiment, the device for mixing can comprise:
a plurality of mixing chambers of the powders, arranged successively in series one after the other, the chamber for supplying powders allowing for the introduction of powders into at least the first mixing chamber,
a plurality of systems for restricting the passage of the powders, with each system for restricting the passage being located between two successive mixing chambers, in order to constrain the distribution of powders from one mixing chamber to the next.

Each mixing chamber can then comprise a cryogenic fluid and means for agitation so as to allow the mixing of the powders placed in suspension in the cryogenic fluid.

Moreover, the means of agitation can comprise mobile mixing facilities, in particular blades, turbines and/or mobile facilities with a duvet effect, among others.

These mobile mixing facilities can comprise grinding facilities.

In addition, the means of agitation can also comprise means for generating vibrations, in particular ultrasonic vibrations, in particular sonotrodes.

Furthermore, the systems for restricting the passage can comprise screens. The systems for restricting the passage can further comprise diaphragms.

The systems for restricting the passage can be adjusted and configured so that their section of passage is decreasing according to the flow of the powders through the plurality of mixing chambers, the section of passage of an (n−1)th system for restricting the passage being as such greater than the section of passage of an nth system of restricting the passage by following the flow of the powders.

In addition, the section of passage of the first system for restricting the passage can be less than the natural section of flow of the powders in such a way as to generate a restriction of the passage as soon as the first system for restricting the passage.

Moreover, the plurality of mixing chambers and the plurality of the systems for restricting the passage of the powders can advantageously be arranged according to the same vertical direction in such a way as to allow for a flow of the powders under the effect of gravity.

The device for mixing can comprise at least two chambers for supplying powders, and in particular as many chambers for supplying powders as there are types of powders to be fixed.

The chamber or chambers for supplying can comprise hoppers with adjustable supply and/or systems of the metering type, in particular vibrating plates or tunnels.

The device for mixing can further comprise:
- a chamber for mixing the powders, comprising a cryogenic fluid, provided with means for forming a fluidised powder bed,
- a chamber for supplying powders in order to allow the powders to be introduced into the mixing chamber,
- a chamber for supplying cryogenic fluid in order to allow the cryogenic fluid to be introduced into the mixing chamber,
- a system for generating vibrations in the fluidised powder bed,
- a system for controlling the system for generating vibrations.

The device for mixing can also comprise a system for analysing the concentration of the suspension of powders and of the cryogenic fluid in the mixing chamber, of which the operation is in particular controlled by the controlling system.

The mixing chamber can be configured in such a way that the introduction of cryogenic fluid into the latter allows for a fluidisation of the powders to be mixed by percolation of the cryogenic fluid through the powder bed fluidised as such.

The mixing chamber can comprise a system for distributing, in particular a grille or a sintered part, of the cryogenic fluid through the fluidised bed of powders in order to allow for a homogeneous distribution of the cryogenic fluid in the fluidised bed.

The system for generating vibrations can be at least partially located in the fluidised powder bed. In particular, the system for generating vibrations can comprise sonotrodes introduced into the fluidised powder bed.

The sonotrodes can be controlled independently by the controlling system in order to induce a periodic phase shift of the phases between the sonotrodes in order to introduce unsteady interferences that improve the mixture within the fluidised bed of powders.

The sonotrodes can be configured to generate pseudo-chaotic oscillations of the Van der Pol type.

The mixing device can furthermore comprise means for agitation in the mixing chamber so as to allow the mixing of the powders placed in suspension in the cryogenic fluid, comprising in particular means for grinding, for example of the ball, roller type, among others.

In addition, the device preferably comprises a system of electrostatic charge of the powders intended to be introduced into the mixing chamber or chambers.

A portion of the powders can in particular be placed in contact with a portion of the electrostatic charge system in order to be positively electrostatically charged and the other portion of the powders can be placed in contact with the other portion of the electrostatic charge system in order to be negatively electrostatically charged, in order to allow for a differentiated local agglomeration. In case of mixture of more than two types of powders, certain powders can be either positively charged, or negatively charged, or without charge.

The cryogenic fluid can moreover be of any type, being in particular liquefied nitrogen or argon. Note that the use of nitrogen is pertinent due to its low price but also due to the fact that the glove boxes and the methods implemented for the elaboration of the nuclear fuel with a plutonium base are inerted with nitrogen and the liquid nitrogen is itself used in certain operations on the fuel (BET measurement, etc.). The usage of this type of cryogenic fluid therefore does not induce any particular additional risk in the method of elaboration.

Furthermore, the invention further has for object, according to another of its aspects, a method for granulating powders, in particular actinide powders, by cryogenic atomisation, characterised in that it is implemented by means of a device such as defined hereinabove, and in that it comprises the following steps:
- a) introduction of powders and of cryogenic fluid into at least one mixing chamber of the device for mixing powders by a cryogenic fluid in order to obtain a suspension of powders and of cryogenic fluid,
- b) atomisation of the suspension of powders and of cryogenic fluid through the device for atomising in order to allow for a granulation of the powders,
- c) obtaining of granules formed from powders.

The obtaining of granules according to the step c) can be carried out by the sublimation of the cryogenic fluid. In this way, it can be possible to obtain spheroid granules that make it possible to form a flowable granular medium.

During the first step a), the powders can advantageously be electrostatically charged differently, in particular oppositely in the presence of at least two types of powders, in order to favour differentiated local agglomeration.

The device and the method for granulating powders according to the invention can comprise any of the characteristics mentioned in the description, taken individually or according to any technically possible combinations with other characteristics.

BRIEF DESCRIPTION OF THE DRAWINGS

The invention can be better understood when reading the following detailed description, of non-limiting embodiments of the latter, as well as examining the figures, diagrammatical and partial, of the annexed drawing, wherein.

In all of these figures, identical references can designate identical or similar elements.

In addition, the various portions shown in the figures are not necessarily shown according to a uniform scale, in order to render the figures more legible.

DETAILED DESCRIPTION OF PARTICULAR EMBODIMENTS

Note that in the embodiments described hereinafter, the powders P considered are actinide powders that allow for the manufacture of pellets of nuclear fuel. In addition, the cryogenic fluid considered here is liquefied nitrogen. However, the invention is not limited to these choices.

Figure 1:
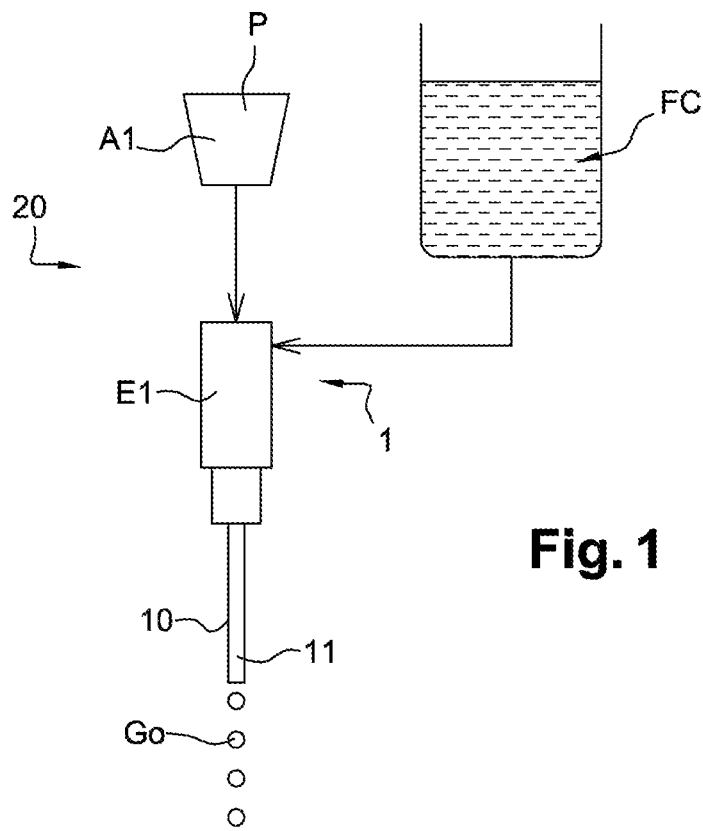
FIG. 1 shows a diagram illustrating the general principle of a device for granulating powders by cryogenic atomisation in accordance with the invention, FIG. 2 diagrammatically shows the phases undergone by the suspension of atomised powders in order to obtain granules of powders.

In reference to FIG. 1, a diagram illustrating the general principle of a device 20 for granulating powders P by cryogenic atomisation in accordance with the invention is shown.

According to this principle, the device 20 for granulating powders P by cryogenic atomisation comprises a device 1 for mixing powders P by a cryogenic fluid FC and a device 10 for atomising a suspension of powders P mixed by the device 1 for mixing powders P in order to allow for a granulation of the powders P.

The device 1 for mixing powders P comprises a mixing chamber E1 of powders P, wherein are introduced the cryogenic fluid FC and the powders P coming from a device A1 for supplying.

The device 10 for atomising is coupled to the device 1 for mixing powders P, and comprises an atomisation nozzle 11 of droplets Go of powders P. Advantageously, the device 10 for atomising comprises a sonotrode.

Advantageously, the device 10 for atomising of the suspension of powders P mixed by the device 1 for mixing powders P comprises means for fractionating the suspension of powders P making it possible to adjust the size of the droplets Go of powders P to be atomised. In addition, this device 10 also comprises means for adjusting the humidity of the mixed powders P and/or the moisture of the atomisation atmosphere.

The adjusting of the humidity of the powders P to be mixed and to be atomised, or the adjusting of the humidity of the atmosphere within which is carried out the atomising of the powders, can make it possible to adjust the cohesion of the agglomerates, or granules Gs, resulting from the atomisation, through the creation of liquid bridges between aggregates Gs, as described hereinafter in reference to FIG. 2.

The controlling of the size of the droplets Go of the suspension of mixed powders P can be carried out through diverse relationships such as described hereinafter.

Indeed, the means for fractionating the suspension of powders P are advantageously configured to allow for the adjusting of the diameter $d_o$ of the droplets Go of powders P to be atomised, in such a way that the diameter $d_o$ of the droplets Go of powders P is defined according to the following relationship:

$$\frac{d_o}{D} = G\left\{\frac{fD}{v}, \frac{1}{We}, \frac{1}{Re}, \frac{A}{D}\right\}$$

with $We = \rho v^2 \cdot (d_o)/\sigma$ and $Re = \rho d_o v/\mu$, where:

f represents the vibration frequency of the device 10 for atomising, v represents the speed of the suspension of powders P, $\rho$ represents the density of the suspension of powders P to be fractionated, $\mu$ represents the viscosity of the suspension of powders P to be fractionated, $\sigma$ represents the surface tension of the suspension of powders P to be fractionated, A represents the oscillation amplitude of the atomisation nozzle 11 of the device 10 for atomising, $d_o$ represents the diameter of the droplets Go, and D represents the diameter of the atomisation nozzle 11 of the device 10 for atomising.

Moreover, the content in powders in the suspension of mixed powders P to be atomised can advantageously be modulated in order to control the reduction factor R of the diameter between the diameter $d_o$ of the droplets Go of powders P to be atomised and the diameter $d_s$ of the granules Gs, or agglomerates, obtained after atomisation of the suspension of mixed powders P and evaporation of the cryogenic fluid FG.

As such, the reduction factor R can be approached via the following formula:

$$\frac{d_0}{d_s} = R = \sqrt[3]{\frac{[U]_f}{[U]_i}}$$

where:

$d_o$ represents the diameter of the droplets Go, $d_s$ represents the diameter of the granules Gs, $[U]_f$ represents the volume occupancy rate of powders P in the agglomerate of granules Gs formed after granulation, and $[U]_i$ represents the concentration in powders P of the suspension of powders P to be atomised.

Beyond controlling the diameter $d_o$ of the droplets Go of the suspension of powders P through one or several of the aforementioned parameters, adjusting the humidity of the powders P makes it possible to procure an increased cohesion of the granules Gs, or agglomerates. This adjustment in the humidity can be done during the introduction of the powders P into the mixing chamber E1 with the liquefied gas FG, or during the evaporation of the liquefied gas FG at the outlet of the atomisation nozzle 11, as shown in FIG. 2 described hereinafter.

Figure 2:
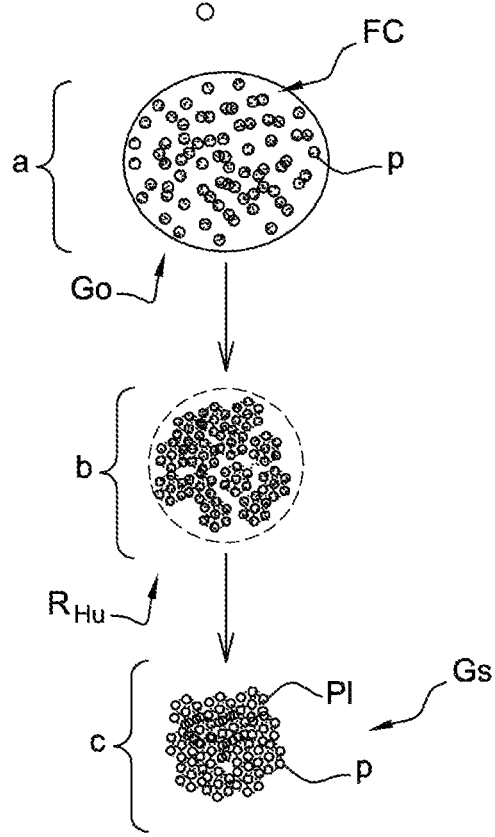

As such, in reference to FIG. 2, the phases undergone by the suspension of atomised powders P in order to obtain granules Gs of powders have been diagrammatically shown.

In the phase a, the droplets Go of the powders P resulting from the atomisation are found of the suspension of powders P. These droplets Go comprise the liquefied gas FG and the powders P.

During the phase b, the liquefied gas FG evaporates. The adjusting of the rate of humidity $R_{Hu}$ can be carried out at this level, as shown.

Then, in the phase c, the agglomeration of the powders is obtained P in order to obtain the spherical granules Gs formed from particles of powders P between which are found liquid bridges of liquefied gas FG that is not evaporated.

Figure 3:
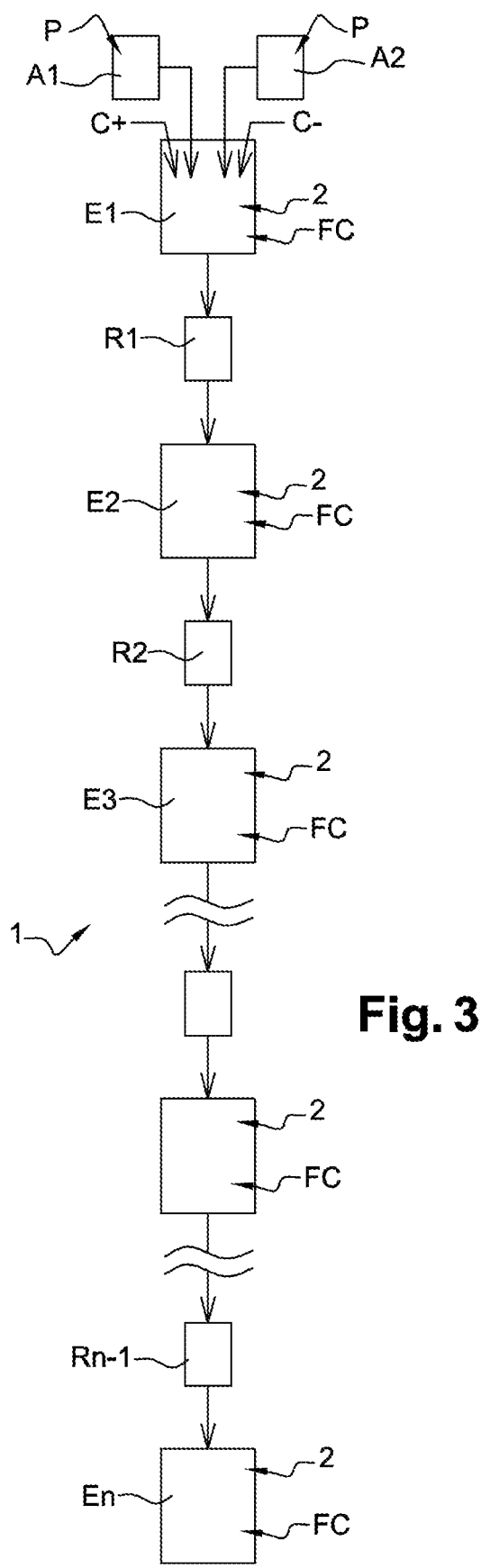
FIG. 3 shows a diagram illustrating the general principle of an example of a device for mixing powders of a device for granulating powders by cryogenic atomisation in accordance with the invention, FIG. 4 diagrammatically shows the agglomeration of particles of powders charged oppositely prior to the introduction thereof into mixing chambers of a device for mixing powders in accordance with the principle of the FIG. 3, FIGS. 5 and 6 respectively show two examples of devices for mixing in accordance with the general principle of FIG. 3 for a device for granulating in accordance with the invention, FIGS. 7A, 7B and 7C diagrammatically show alternative embodiments of the mobile mixing facilities of the device for mixing of FIGS. 5 and 6.

Now in reference to FIG. 3, a diagram is shown illustrating the general principle of an example of the device 1 for mixing powders P by a cryogenic fluid for a device 20 for granulating powders P by cryogenic atomisation in accordance with the invention, such as for example described hereinabove in reference to FIG. 1.

According to this principle, the device for mixing 1 comprises a number n of mixing chambers E1, ..., En of the powders P, arranged successively in series one after the other according to the same vertical direction in such a way that the powders can circulate through the mixing chambers E1, ..., En under the effect of the force of gravity.

Moreover, the device 1 comprises a number n−1 of systems for restricting the passage R1, ..., Rn−1 of the powders P, with each system for restricting the passage R1, ..., Rn−1 being located between two successive mixing chambers E1, ..., En, in order to constrain the distribution of powders P from one mixing chamber E1, ..., En to the next. Examples of such systems for restricting the passage R1, ..., Rn−1 are shown in what follows in reference in particular to FIGS. 5 and 6.

Furthermore, the systems for restricting the passage can comprise screens. The systems for restricting the passage can further comprise diaphragms.

The systems for restricting the passage can be adjusted and configured so that their section of passage is decreasing according to the flow of the powders through the plurality of mixing chambers, the section of passage of an (n−1)th system for restricting the passage being as such greater than the section of passage of an nth system of restricting the passage by following the flow of the powders.

In addition, the section of passage of the systems for restricting the passage can be less than the natural section of flow of the powders in such a way that these powders are necessarily deagglomerated when they pass from one mixing chamber to the other. As such, the residence time of the particles to be mixed is intrinsically sufficient to allow for deagglomeration.

In addition, the device 1 also comprises two chambers A1 and A2 for supplying powders P, provided in particular for distributing powders of different types.

The two chambers A1 and A2 for supplying powders P allows for the introduction of the powders P into the first mixing chamber E1 in contact with the cryogenic fluid FC of the first chamber E1. Then the powders P successively pass through the systems for restricting the passage R1, ..., Rn−1 and the mixing chambers E2, ..., En, with each mixing chamber comprising a cryogenic fluid FC.

In addition, each mixing chamber E1, ..., En comprises means for agitation 2 allowing for the mixing of powders P placed in suspension in the cryogenic fluid FC. Examples of such means of agitation 2 are provided in what follows in reference in particular to FIGS. 5 and 6.

The two chamber for supplying A1 and A2 comprise for example hoppers with adjustable supply, using for example an endless screw, and/or systems of the metering type, in particular vibrating plates or tunnels.

Furthermore, advantageously, the device 1 further comprises an electrostatic charge system C+, C− of the powders P introduced into the mixing chambers E1, ..., En.

In particular, the portion of the powders P contained in the first chamber for supplying A1 is put into contact with the positive portion C+ of the electrostatic charge system in order to be positively electrostatically charged, while the portion of the powders P contained in the second chamber for supplying A2 is put into contact with the negative portion C− of the electrostatic charge system in order to be negatively electrostatically charged.

Figure 4:
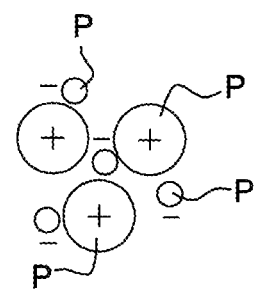

In this way, it is possible to allow for a differentiated local agglomeration, in other words prevent self-agglomeration. As shown in FIG. 4, which diagrammatically shows the agglomeration of particles of powders P charged oppositely prior to the introduction thereof into the mixing chambers E1, ..., En, with the particles of the two powders P to be mixed being of an opposite electrostatic charge, a possible reagglomeration will occur mostly through the interposing of powders with a nature, and therefore charge, that are different. This as such makes it possible to favour mixing on the scale of the particles that comprise the powders P to be mixed.

The invention as such makes use of various technical effects that make it possible in particular to achieve the desired level of homogenisation, such as those described hereinafter:

the improved deagglomeration, at least partial, of the powders P when the latter are placed in suspension in the cryogenic liquid FC, the improvement of the wettability of the powders P by using the liquefied gas constituted by the cryogenic fluid FC, which is a liquid with a low surface tension, compared to water, the latter being advantageously used without the use of additives which are difficult to eliminate, the agitation close to the regime of a perfectly agitated reactor implemented by the movement of the means for agitation, able or not able to use the placing in vibration of the suspension as described in what follows, with these vibrations then being advantageously unsteady in order to limit the heterogeneous zones.

In reference now to FIGS. 5 and 6, two examples of devices 1 for mixing for a device 20 for granulating powders P by cryogenic atomisation in accordance with the invention are diagrammatically shown, of which the principles have been described hereinabove in reference to FIG. 3.

In each one of these two examples, the device for mixing 1 comprises, in addition to the elements described hereinabove in reference to FIG. 3, an agitation motor 5 able to drive in rotation first means of agitation 2a having the form of mobile mixing facilities 2a in the mixing chambers E1, ..., En.

These mobile mixing facilities 2a can comprise mobile grinding facilities. These mobile mixing facilities 2a can further comprise blades, mobile facilities with a duvet effect, turbines and/or blades, with these types of mobile facilities being respectively shown in the FIGS. 7A, 7B and 7C. In the embodiments of FIGS. 5 and 6, the mobile mixing facilities 2a comprise turbines.

Moreover, in each one of these two examples, the device 1 further comprises second means of agitation 2b in the form of means for generating ultrasonic vibrations comprising sonotrodes 2b.

Figure 5:
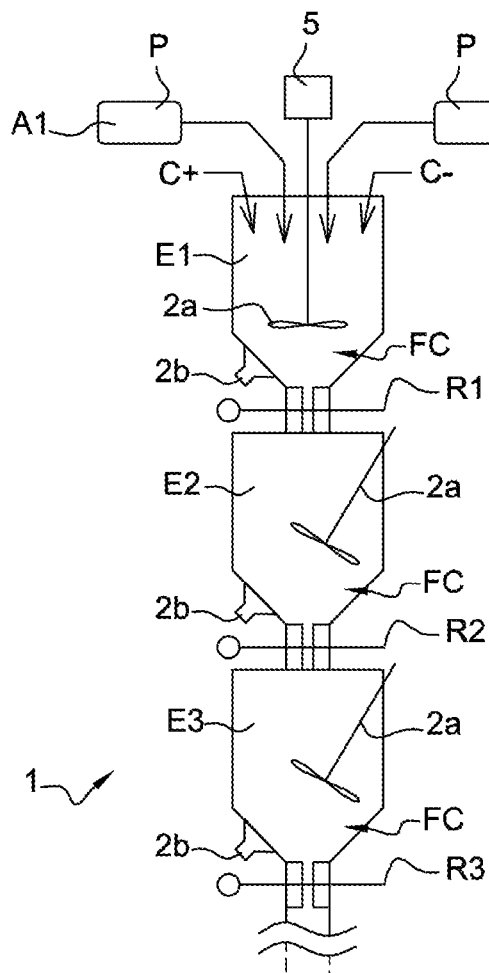
Figure 5:
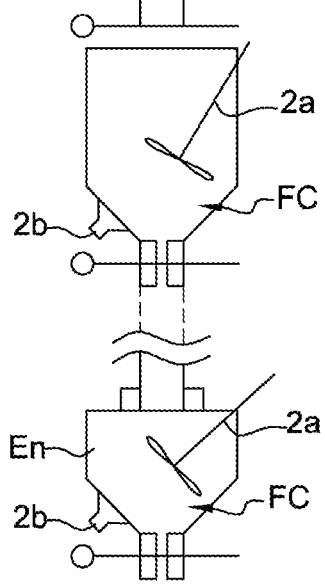
Figure 6:
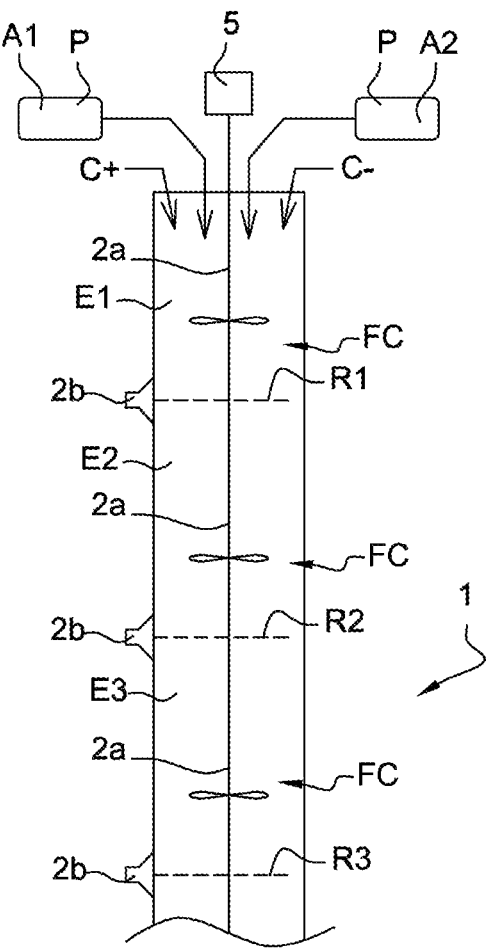
Figure 6:
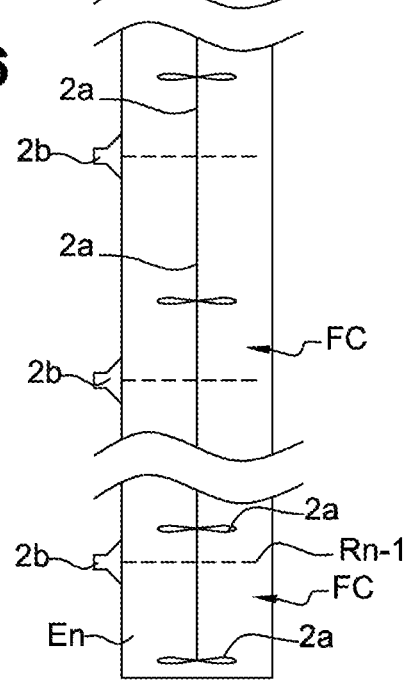
Figure 7A:
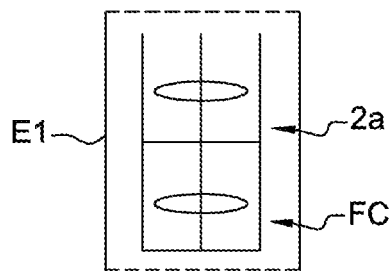
Figure 7B:
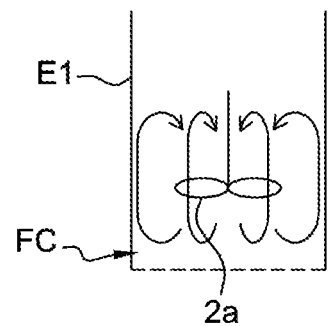
Figure 7C:
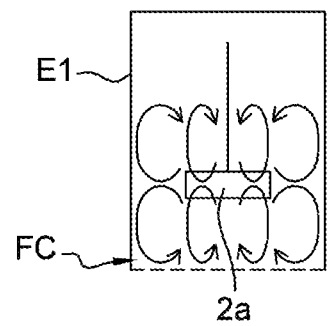

In addition, the two embodiments shown in the FIGS. 5 and 6 are differentiated by the nature of the systems for restricting the passage R1, ..., Rn−1 used.

As such, in the embodiment of FIG. 5, the systems for restricting the passage R1, ..., Rn−1 comprise diaphragms.

In the embodiment of FIG. 6, the systems for restricting the passage R1, ..., Rn−1 comprise screens, more precisely meshes of screens.

In these two examples, the systems for restricting the passage R1, ..., Rn−1 have a section of passage that can be adjusted and as such arranged in such a way that their sections of passage are ranked from the largest to the finest in the descending direction of the flow of powders P. Advantageously also, the sections of passage of these systems for restricting the passage R1, . . . , Rn−1 are less than the section of natural flow of the powders P in order to force the deagglomeration before the passage through these sections.

Figure 8:
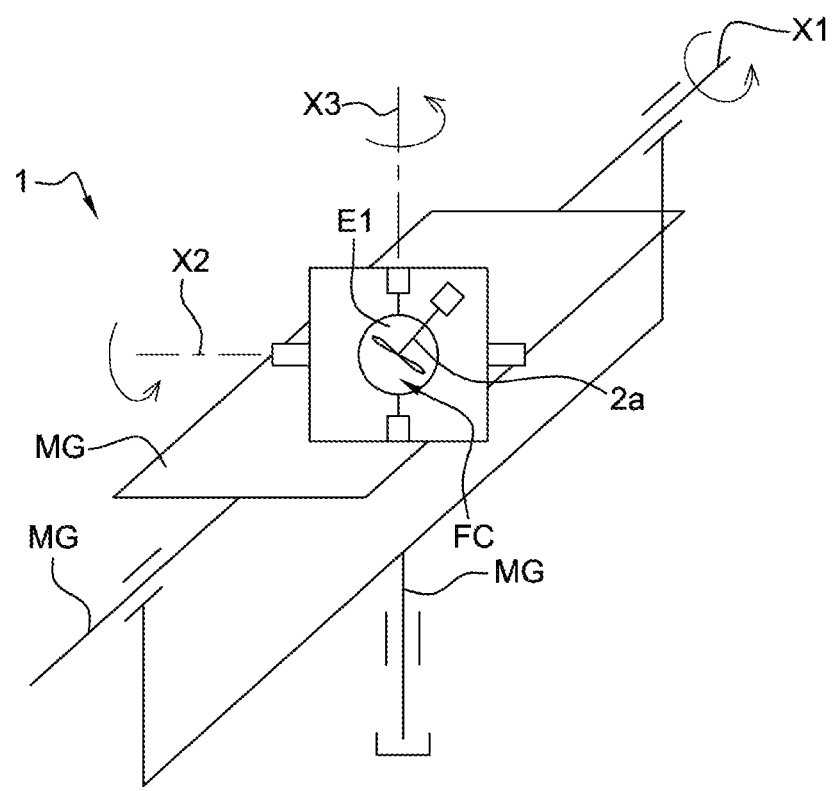
FIG. 8 shows a diagram illustrating another example of a device for mixing powders of a device for granulating powders by cryogenic atomisation in accordance with the invention.

In reference to FIG. 8, a diagram illustrating another example of the device 1 for mixing powders P for a device 20 for granulating powders P by cryogenic atomisation in accordance with the invention is furthermore shown.

In this example, the device 1 comprises a single mixing chamber E1 and means for mixing MG of this mixing chamber E1 according to a gyroscopic movement.

More precisely, these means for mixing MG according to a gyroscopic movement allow for the rotation of the mixing chamber E1 according to the three axes X1, X2 and X3 of three-dimensional metrology. This type of agitation by gyroscopic movement favours the mixture of powders P when they have high densities compared to the density of the fluid phase of the cryogenic fluid FC located in the mixing chamber E1.

In addition, the mixing chamber E1 comprises means for agitation 2a, for example in the form of turbines.

Figure 9:
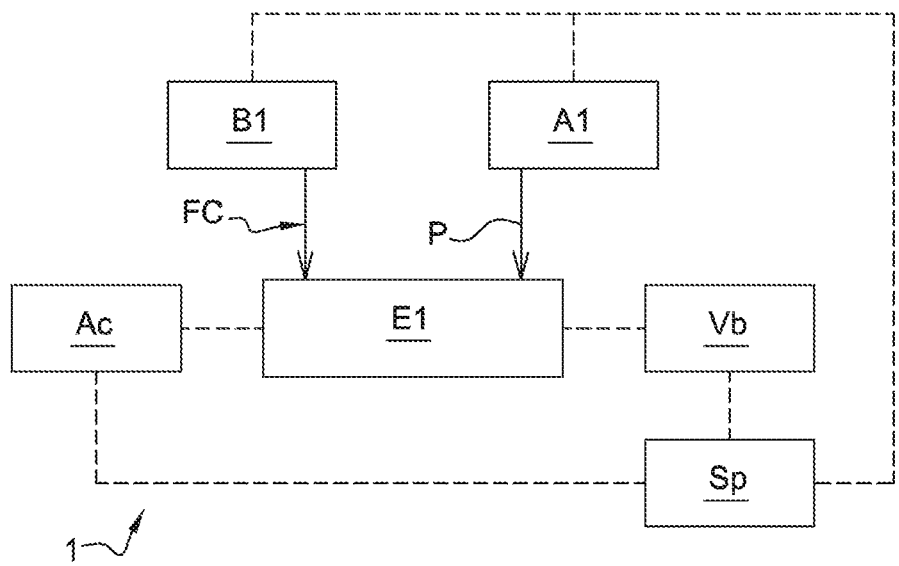
FIG. 9 shows a diagram illustrating the general principle of another device for mixing powders by a cryogenic fluid pour a device for granulating powders by cryogenic atomisation in accordance with the invention, FIG. 10 partially shown another example of a device for mixing for a device for granulating powders by cryogenic atomisation in accordance with the invention.

Now in reference to FIG. 9, a diagram illustrating the general principle of another example of the device 1 for mixing powders P by a cryogenic fluid for a device for granulating 20 in accordance with the invention is shown.

Figure 10:
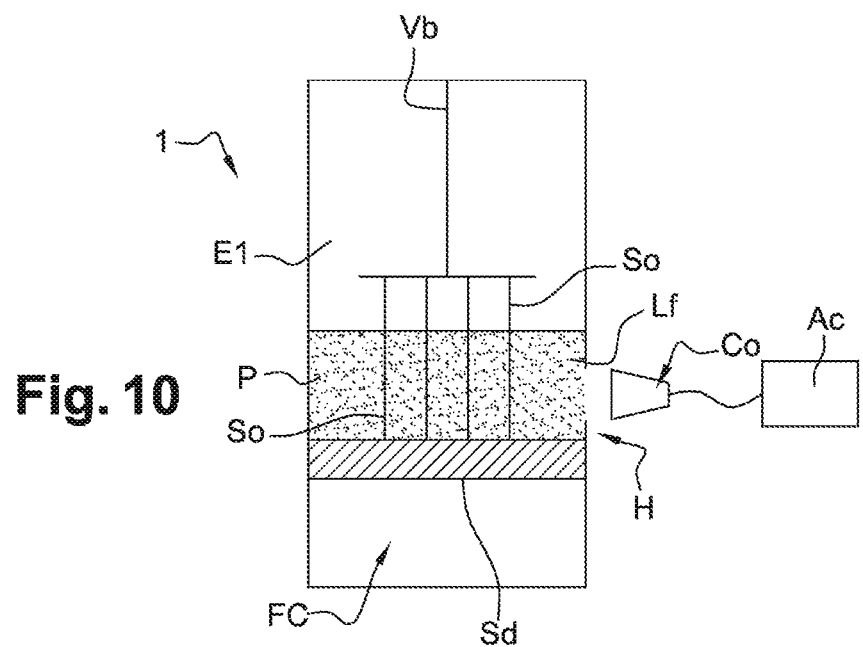

According to this principle, the device for mixing 1 comprises a mixing chamber E1, thermally insulated, of powders P provided with means for forming a fluidised powder bed Lf, which can be seen in FIG. 10 described in what follows.

In addition, the device for mixing 1 comprises a chamber A1 for supplying powders P in order to allow for the introduction of powders P into the mixing chamber E1, and a chamber B1 for supplying cryogenic fluid FC in order to allow for the introduction of the cryogenic fluid FC into the mixing chamber E1. In this way, it is possible to obtain a suspension of powders P and of the cryogenic fluid FC in the mixing chamber E1 forming a fluidised bed Lf.

The chamber B1 for supplying cryogenic fluid FC can correspond to a chamber for distributing or a chamber for recirculating cryogenic fluid FC. This chamber B1 for supplying can allow for the distribution and/or the recycling of cryogenic fluid FC. It can in particular for a portion rely on a pressurising of a reservoir for the supply of liquefied gas.

Moreover, advantageously, the device for mixing 1 comprises also a system for generating vibrations Vb in the fluidised powder bed Lf, a system Sp for controlling this system for generating vibrations Vb, and a system for analysing the concentration Ac of the suspension of powders P and of cryogenic fluid FC in the mixing chamber E1, of which the operation is controlled by the controlling system Sp.

The controlling system Sp can in particular allow for the controlling of the operation of the device 1 and the processing of data, in particular in terms of conditions for supplying with powders P, with cryogenic fluid FC and/or in terms of amplitude of the vibrations.

Advantageously, as it will appear more clearly in reference to FIG. 10, the mixing chamber E1 is configured in such a way that the introduction of cryogenic fluid FC into the latter will allow for a placing in fluidisation of the powders P to be mixed by percolation of the cryogenic fluid FC through the powder bed fluidised as such Lf.

In reference to FIG. 10 indeed, an example of the mixing device is partially and diagrammatically shown 1 for a device for granulating 20 in accordance with the invention.

This mixing device 1 comprises a mixing chamber E1 forming a reservoir with a main vertical axis having a symmetry of revolution, in particular in the shape of a cylinder, and being advantageously thermally insulated in order to minimise heat losses as its vocation is to receive a circulating liquefied gas phase.

Advantageously, the cryogenic fluid FC (liquefied gas) is introduced into the bottom portion of the mixing chamber E1, at the inlet of the fluidised bed Lf of powders P, through a distribution system Sd, in particular in the form of a grille or sintered part, making it possible to distribute the cryogenic fluid FC homogeneously over the section of the passage of the fluidised bed Lf.

Moreover, the mixing chamber E1 can be provided with a diverging zone in order to disengage the smallest particles of powders P and allow them to remain in the zone of the fluidised bed Lf.

Furthermore, a system for analysing the concentration Ac of the suspension of powders P and of cryogenic fluid FC in the mixing chamber E1 is also provided, with this system Ac comprising in particular an optical sensor Co making it possible to observe the fluidised bed Lf of powders P through a viewing porthole H. The system Ac is as such interfaced through the fluidised bed Lf.

The system for analysing the concentration Ac, provided with the optical sensor Co, can make it possible to analyse the concentration of the powders P, and even also analyse the granulometry of the granular medium formed in the mixing chamber E1.

The system for analysing the concentration Ac can comprise an optical fibre of the emitting type (source of light illuminating the fluidised bed Lf) and receiving (sensor) type. It can further comprise a camera. Note then that the concentration of the particles depends on the distance between the emitting fibre and the receiving fibre, on the granulometric distribution of the particles, in the refractive index of the granular medium, and on the wavelength of the incident beam in the dispersion medium.

Moreover, the device 1 comprises the system for generating vibrations Vb. This system advantageously comprises sonotrodes So.

Figure 11:
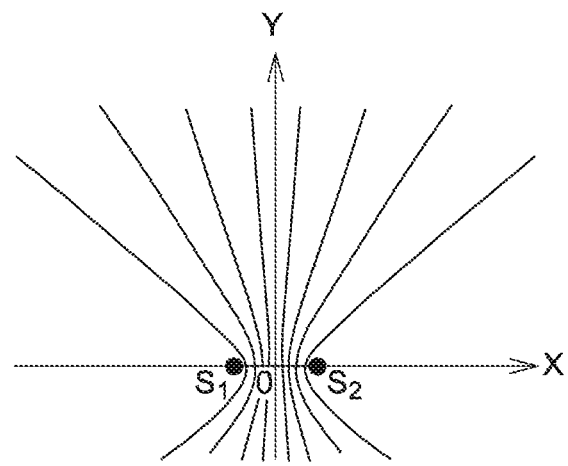
FIG. 11 shows a representation of lines of interferences induced by two vibrational sources having two vibratory sources that have the same pulse frequency.

As can be seen in FIG. 10, the system for generating vibrations Vb is introduced in line with the fluidised bed Lf as close as possible to the introduction of the cryogenic fluid FC. In particular, the sonotrodes So can plunge within the fluidised bed Lf. The sonotrodes So can be controlled independently by the controlling system Sp (not shown in FIG. 10) in order to induce a periodic phase shift of the phases between the sources of vibrations in order to introduce unsteady interferences, in such a way as to improve the mixture within the fluidised bed Lf of powders P. In this respect, FIG. 11 shows a representation of the interference lines induced by two vibratory sources S1 and S2 having the same pulse frequency.

Figure 12A:
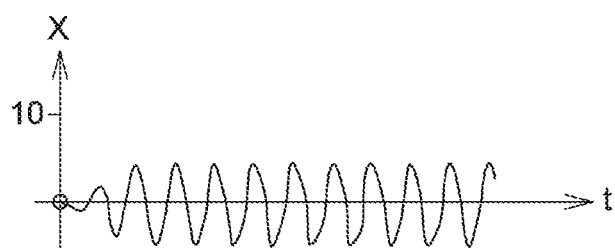
FIGS. 12A and 12B show the generation of stable oscillations after convergence.
Figure 12B:
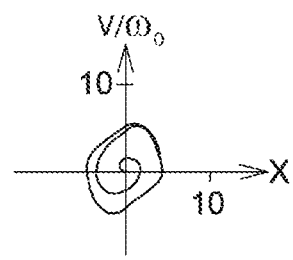
Figure 13A:
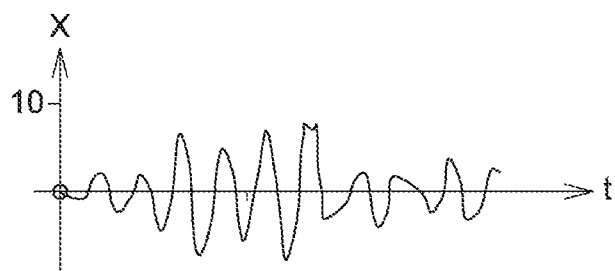
FIGS. 13A and 13B show the generation of quasi-chaotic oscillations of an oscillator of the Van der Pol type.
Figure 13B:
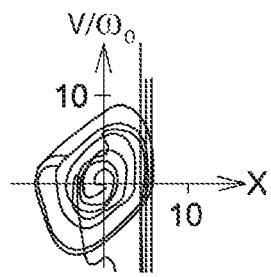

Moreover, advantageously, the controlling of the vibrations through the controlling system Sp can induce chaotic vibratory signals. This can be achieved by controlling the sonotrodes So as as many oscillators of the Van der Pol type. In this respect, FIGS. 12A-12B and 13A-13B show the forms of interference within the suspension of powders P induced by two sources that have the same pulse phase, with these phases being constant. More precisely, FIGS. 12A and 12B show the generation of stable oscillations after convergence (a=2.16, b=2.28 and $w_0$=3), while FIGS. 13A and 13B show the generation of quasi-chaotic oscillations of an oscillator of the Van der Pol type, of an equation of the type $x''+ax'\cdot(x^2/b^2-1)+w_0^2\cdot x=0$, by time variation of the pulse $w_0$.

Note that, by varying the phases of the sources of vibrations, the interferences can travel by a distance equivalent to the magnitude of the wavelength of the vibrations injected within the fluidised bed Lf. This thus allows for an addition degree of mixture.

The application of vibrations according to complex oscillations, in particular quasi chaotic, contribute to a practically perfect mixing effect.

Moreover, it is also to be noted that the chamber A1 for supplying powders P (not shown in FIG. 10) can allow for a supply via gravity, or even by a device of the endless screw type, or further even through a vibrating bed, for example.

In addition, advantageously, the powders P can be electrostatically charged with opposite charges in order to make it possible during the placing in suspension to obtain a differentiated reagglomeration.

Of course, the invention is not limited to the embodiments that have just been described. Various modifications can be made thereto by those skilled in the art.

The invention claimed is:

1. A device for granulating powders by cryogenic atomisation, comprising:
a device for mixing powders by a cryogenic fluid, comprising at least one chamber for mixing powders, comprising the cryogenic fluid, wherein the cryogenic fluid is a liquified gas and chemically inert; and
a device for atomising a suspension of powders mixed by the device for mixing powders in order to allow for a granulation of the powders, wherein the device fractionates the suspension of powders making it possible to adjust the size of droplets of the powders and adjusts the moisture of the mixed powders and/or moisture of the atomisation atmosphere and wherein for fractionating the suspension of powders, the device is configured to allow for the adjusting of the diameter of the droplets of powders to be atomised, in such a way that the diameter of the droplets of powders is defined according to the following relationship:

$$\frac{d_o}{D} = G\left\{\frac{fD}{v}, \frac{1}{We}, \frac{1}{Re}, \frac{A}{D}\right\}$$

with $We=\rho v^2\cdot(d_o)/\sigma$ and $Re=\rho d_o v/\mu$,
where:
f represents the vibration frequency of the device for atomising,
v represents the speed of the suspension of powders,
ρ represents the density of the suspension of powders to be fractionated,
μ represents the viscosity of the suspension of powders to be fractionated,
σ represents the surface tension of the suspension of powders to be fractionated,
A represents the oscillation amplitude of an atomisation nozzle of the device for atomising,
$d_o$ represents the diameter of the droplets, and
D represents the diameter of an atomisation nozzle of the device for atomising.

2. The device according to claim 1, wherein the powders to be mixed are actinide powders.

3. The device according to claim 1, wherein the cryogenic fluid comprises a slightly hydrogenated liquid, which is a liquid comprising at most one hydrogen atom per molecule of liquid, having a boiling temperature less than that of water, and wherein the cryogenic fluid is a gas at room temperature and a liquid at a temperature lower than room temperature.

4. The device as claimed in claim 1, wherein the device for mixing further comprises:
a chamber for supplying powders in order to allow the powders to be introduced into the at least one chamber for mixing,
means for agitation in the mixing chamber so as to allow the mixing of the powders placed in suspension in the cryogenic fluid.

5. The device according to claim 4, wherein the device for mixing comprises means for mixing of the at least one chamber for mixing according to a gyroscopic movement.

6. The device according to claim 4, wherein the device for mixing comprises:
a plurality of mixing chambers of the powders, arranged successively in series one after the other, the chamber for supplying powders allowing for the introduction of powders into at least the first mixing chamber,
a plurality of systems for restricting passage of the powders, with each system for restricting the passage being located between two successive mixing chamber, in order to constrain the distribution of powders from one mixing chamber to the next, with each mixing chamber comprising the cryogenic fluid and means for agitation so as to allow the mixing of the powders placed in suspension in the cryogenic fluid.

7. The device according to claim 6, wherein the systems for restricting the passage comprise screens and/or diaphragms.

8. The device according to claim 4, wherein the means for agitation comprise mobile mixing devices.

9. The device according to claim 4, wherein the means for agitation comprise means for generating vibrations.

10. The device according to claim 4, wherein the device for mixing comprises a system of electrostatic charge of the powders intended to be introduced into the mixing chamber or chambers.

11. The device according to claim 10, wherein a portion of the powders is put into contact with a portion of the electrostatic charge system in order to be positively electrostatically charged and wherein the other portion of the powders is put into contact with the other portion of the electrostatic charge system in order to be negatively electrostatically charged, in order to allow for a differentiated local agglomeration.

12. The device as claimed in claim 1, wherein the cryogenic fluid is liquefied nitrogen.

13. Method for granulating powders by cryogenic atomisation using the device claim 1, and comprising the following steps:
a) introducing powders and cryogenic fluid into at least one chamber of the device for mixing powders by a cryogenic fluid in order to obtain a suspension of powders and of cryogenic fluid,
b) atomising of the suspension of powders and of cryogenic fluid through the device for atomising in order to allow for a granulation of the powders, wherein the suspension of powders are fractionated making it possible to adjust the size of droplets of the powders and adjusts the moisture of the mixed powders and/or moisture of the atomisation atmosphere and wherein the diameter of the droplets of powders to be atomised are adjustable in such a way that the diameter of the droplets of powders is defined according to the following relationship:

$$\frac{d_o}{D} = G\left\{\frac{fD}{v}, \frac{1}{We}, \frac{1}{Re}, \frac{A}{D}\right\}$$

with $We = \rho v^2 \cdot (d_o)/\sigma$ and $Re = \rho d_o v/\mu$,
where:
f represents the vibration frequency of the device for atomising,
v represents the speed of the suspension of powders,
ρ represents the density of the suspension of powders to be fractionated,
μ represents the viscosity of the suspension of powders to be fractionated,
α represents the surface tension of the suspension of powders to be fractionated,
A represents the oscillation amplitude of an atomisation nozzle of the device for atomising,
$d_o$ represents the diameter of the droplets, and
D represents the diameter of an atomisation nozzle of the device for atomising, and
  c) obtaining of granules formed from powders.
  14. Method according to claim 13, wherein during the first step a), the powders are oppositely electrostatically charged in order to favour differentiated local agglomeration.
  15. A device for granulating powders by cryogenic atomisation, comprising:
    a device for mixing powders by a cryogenic fluid, comprising at least one chamber for mixing powders, comprising the cryogenic fluid, wherein the cryogenic fluid is a liquified gas and chemically inert; and
    a device for atomising a suspension of powders mixed by the device for mixing powders in order to allow for a granulation of the powders, wherein the device fractionates the suspension of powders making it possible to adjust the size of droplets of the powders and adjusts the moisture of the mixed powders and/or moisture of the atomisation atmosphere and wherein for fractionating the suspension of powders, the device is configured to allow for the adjusting of the diameter of the droplets of powders to be atomised by modulation according to a reduction factor of the diameter between the diameter of the droplets of powders to be atomised and the diameter of the granules obtained after atomisation of the suspension of mixed powders and evaporation of the cryogenic fluid, in such a way that:

$$\frac{d_0}{d_s} = R = \sqrt[3]{\frac{[U]_f}{[U]_i}}$$

where:
$d_0$ represents the diameter of the droplets,
$d_s$ represents the diameter of the granules,
$[U]_f$ represents the volume occupancy rate of powders in the agglomerate of granules formed after granulation, and
$[U]_i$ represents the concentration in powders of the suspension of powders to be atomised.
  16. A device for granulating powders by cryogenic atomisation, comprising:
    a device for mixing powders by a cryogenic fluid, comprising at least one chamber for mixing powders, comprising the cryogenic fluid, wherein the cryogenic fluid is a liquified gas and chemically inert; and
    a device for atomising a suspension of powders mixed by the device for mixing powders in order to allow for a granulation of the powders, wherein the device fractionates the suspension of powders making it possible to adjust the size of droplets of the powders and adjusts the moisture of the mixed powders and/or moisture of the atomisation atmosphere and
  wherein the device for mixing further comprises:
    the at least one chamber for mixing the powders, comprising the cryogenic fluid, provided with means for forming a fluidised powder bed,
    a chamber for supplying powders in order to allow the powders to be introduced into the mixing chamber,
    a chamber for supplying the cryogenic fluid in order to allow the cryogenic fluid to be introduced into the mixing chamber,
    a system for generating vibrations in the fluidised powder bed,
    a system for controlling the system for generating vibrations.
  17. The device according to claim 16, wherein the device for mixing further comprises a system for analysing the concentration of the suspension of powders and of the cryogenic fluid in the at least one chamber for mixing.
  18. The device according to claim 16, wherein the at least one chamber for mixing comprises a distribution system of the cryogenic fluid through the fluidised bed of powders in order to allow for a homogeneous distribution of the cryogenic fluid in the fluidised bed.
  19. The device according to claim 16, wherein the system for generating vibrations is at least partially located in the fluidised bed of powders.
  20. The device according to claim 19, wherein the system for generating vibrations comprises sonotrodes introduced into the fluidised bed of powders.
  21. The device according to claim 20, wherein the sonotrodes are controlled independently by the controlling system in order to induce a periodic phase shift of the phases between the sonotrodes in order to introduce unsteady interferences that improve the mixture within the fluidised bed of powders.
  22. The device according to claim 20, the sonotrodes are configured to generate pseudo-chaotic oscillations of the Van der Pol type.

* * * * *